Patented Sept. 23, 1952

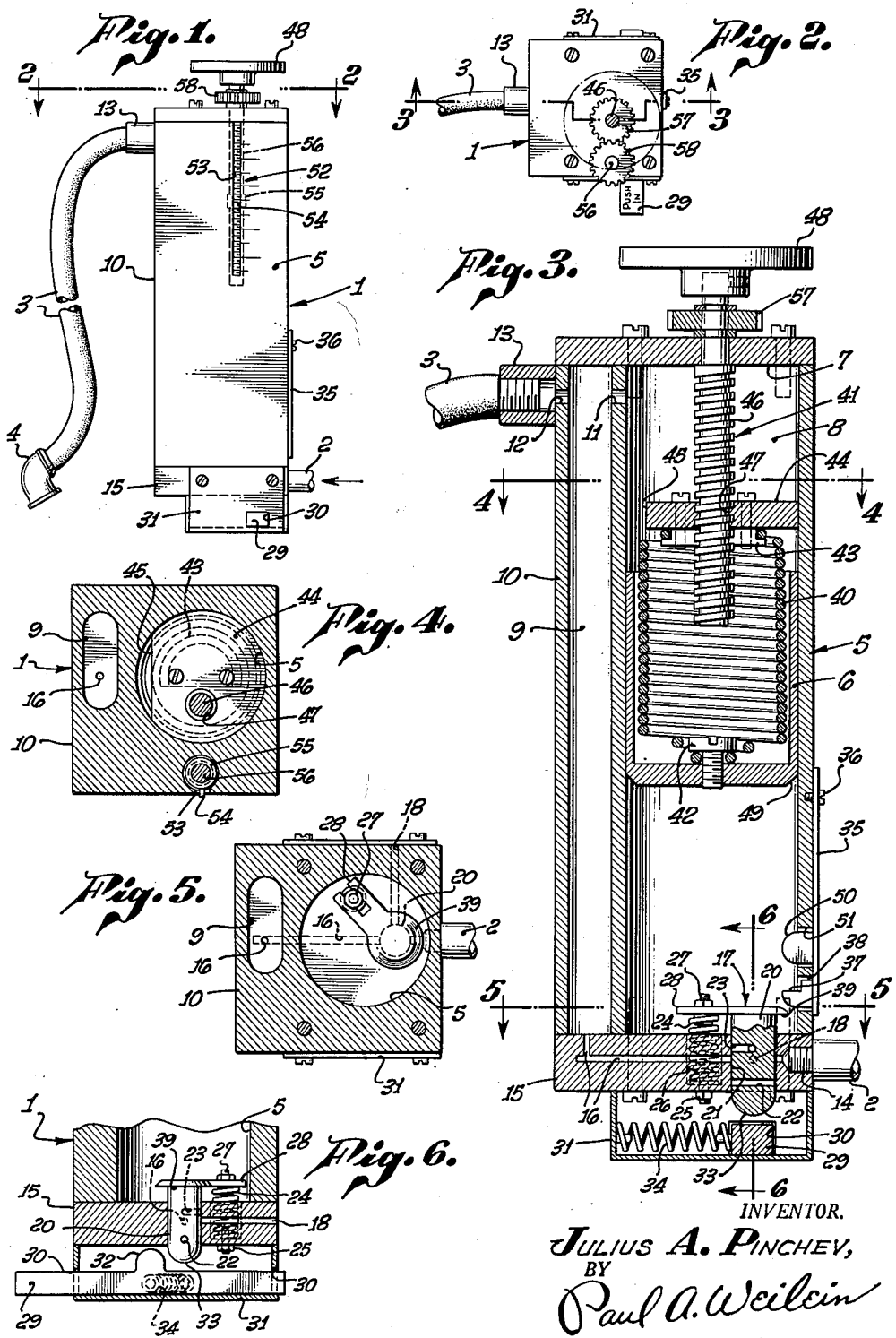

2,611,385

UNITED STATES PATENT OFFICE 2,611,385

AUTOMATIC CUTOFF AND RELIEF VALVE FOR TIRES

Julius A. Pinchev, Los Angeles, Calif.

Application March 5, 1946, Serial No. 652,072

7 Claims. (Cl. 137—224)

This invention relates to tire gauges.

It is an object of this invention to provide an improved tire gauge by means of which a pneumatic tire may be inflated to a predetermined pressure with an automatic cessation of inflation incident to the tire becoming inflated to the predetermined pressure.

It is another object of this invention to provide an accurate gauge of the character described which is adjustable for providing the desired inflation pressure or the pressure best suited to the particular tire.

It is another object of this invention to provide a tire gauge such as described which when applied to a tire having a pressure in excess of a predetermined pressure to which the gauge is set, will cause the excessive air pressure to be automatically released to the atmosphere and the predetermined pressure to be maintained in the tire.

Referring to the drawings:

Fig. 1 is a side elevation of an air gauge embodying the present invention;

Fig. 2 is a top plan view looking from the plane of line 2—2 of Fig. 1;

Fig. 3 is an enlarged vertical sectional view taken on line 3—3 of Fig. 2;

Fig. 4 is a horizontal sectional view on a reduced scale taken on line 4—4 of Fig. 3;

Fig. 5 is a horizontal sectional view on a reduced scale taken on line 5—5 of Fig. 3; and Fig. 6 is a fragmentary sectional view taken on line 6—6 of Fig. 3.

As shown in the accompanying drawings, an adjustable gauge embodying the present invention and generally designated 1, is adapted to be connected with a compressed air supply line 2 and the usual flexible hose 3 having a conventional tire valve chuck 4 thereon. With this arrangement the flow of air into and from a pneumatic tire may be controlled in accordance with the setting of the gauge.

The gauge 1 includes a cylinder 5 and a piston 6 forming between the piston and the cylinder head 7, an expansible chamber 8. In the wall 10 of this cylinder, is a fluid passage 9 which is communicated through a port 11 with the chamber 8, and communicated by means of a port 12 with a nipple 13 to which the flexible hose 3 is connected.

Air under pressure from the supply line 2 enters an intake port 14 in the bottom wall 15 of the cylinder 5, and passes through a restricted passage 16 in said bottom wall, into the fluid passage 9.

Valve means 17 is provided to control the flow of air through the passage 16 also the flow of air through an outlet port 18 which leads from passage 16 to the exterior of the bottom wall 15, for venting air to the atmosphere in the event of excessive inflation of a tire.

As here shown the valve means 17 includes a valve closure member 20 slidable in a bore 21 intersecting the passage 16 and port 18 in the bottom wall 15. Axially spaced on the valve member are through ports 22 and 23 adapted to be brought into registration with the passage 16 and port 18, respectively, according to the position of the valve member 20. The port 23 is L-shaped so as to communicate the passage 16 with the outlet port 18 while the valve member is in position to shut off the supply of air from the line 2.

The valve member 20 is maintained in position closing the passage 16 and port 18 as shown in Fig. 3, by means of a spring 24. One end of this spring is secured as at 25 in a recess 26 in the bottom wall 15. The other end of the spring is secured as at 27 to an arm 28 extending laterally from the upper end of the valve member 20.

Means is provided for manually moving the valve member 20 upwardly to register the port 22 with the passage 16 whereby air will pass through the gauge for inflating the tire. As here shown this means includes an operating bar 29 slidable in openings 30 in opposed walls of a housing 31 secured to the bottom wall 15. A cam surface 32 on the bar 26 is adapted to engage the rounded end 33 of the valve member 20 to move the latter into position to open passage 16 against the force of the spring 24. However, the bar is biased by an off-center spring means 34 so that after it is operated to open the valve member 20, it will remain in position with the cam surface 32 clear of the valve member 20 with either end projecting from the housing as shown in Fig. 6.

It is desired that the valve member 20 when raised to open the passage 16, will remain in such position until a predetermined inflation pressure is attained. For this purpose a latch means is provided in the form of a spring arm 35 fixed at one end as at 36 to the exterior of the cylinder 5. A latch member 37 is carried on the other end of the arm 35 so as to extend through an opening 38 in the wall of the cylinder 5. When the valve member 20 is moved upwardly to open passage 16, a bevelled end portion 39 on the upper end of the valve member encounters the latch member 37 which then yields outwardly and then snaps under the end portion 39, thereby holding the valve member 20 in open position.

As shown in Fig. 3, a coil spring 40 is connected with the piston 6 and piston adjusting means 41 so as to resist movement of the piston in a direction for releasing the latch member 37. One reduced end of the spring 40 is secured as at 42 to the piston while the other reduced end is secured by clamp means 43 to a follower member 44. This follower member has a sliding fit in the chamber 8 and forms a part of the means 41, being cut away as at 45 to permit air to be effective beneath it against the piston.

The piston adjusting means 41 includes a screw threaded rod 46 rotatably journalled in the cylinder head 7 and threadedly engaged in a screw threaded opening 47 in the follower member 44, whereby on turning of the screw threaded rod as by means of the handle 48 on the upper end thereof, the piston 6 will be raised or lowered depending upon direction of rotation of the rod. This arrangement provides for setting the piston 6 at different positions in the cylinder 5 according to the inflation pressure desired, it being apparent that if the piston is set a greater distance from the latch 37, a greater pressure will be required to release the latch 37 and allow the valve member 20 to close. Conversely, on setting the piston nearer to the latch member 37, the valve member 20 will be closed at a lower pressure. In all instances of the piston moving to cause the valve 20 to close, the spring 40 yields, thus allowing the necessary piston travel. The piston will return to the predetermined position to which it has been set upon removing the chuck from the tire valve.

The release of the latch member 37 is effected by the bevelled lower end 49 of the piston contacting a cam member 50 arranged on the spring member 35 to extend through an opening 51 into the lower portion of cylinder 5. Upon being contacted by the end 49 of the piston, the cam member 50 causes the member 35 to be moved so as to withdraw the latch member 37 and allow the spring 24 to close the valve member 20.

Provision is made for automatically relieving air from the tire in the event the pressure therein when the gauge is applied thereto, is greater than desired or in other words greater than the pressure setting of the gauge. Accordingly, when this excess pressure is encountered the piston will move downwardly and push the valve member 20 downwardly against the action of the spring 24, until the L-shaped port 23 registers passage 16 with outlet port 18. When the valve is in this position air from the line 2 is shut off but the excess air in the tire will be vented to the atmosphere. When the excess pressure is relieved, the piston will be raised by the spring 40 thereby allowing the spring 24 to move the valve into the closed position shown in Fig. 3.

A pressure indicating scale 52 is provided on the exterior of the cylinder 5 along the edge of a vertical groove 53 cut in the cylinder wall. An index 54 is provided on a nut 55 which is threaded on a screw threaded rod 56 rotatably mounted in the groove 53. Rotation of this screw threaded rod 56 is effected by means of enmeshed gears 57 and 58 on the rods 46 and 56 respectively. These rods are correspondingly threaded and the scale 52 is so graduated that on turning the rod 46 to vary the position of the piston 6, the index 54 will indicate on the scale 52, the pressure setting of the gauge.

I claim:

1. In an automatic fluid flow control device: means, including a movable element, forming an expansible chamber; means resiliently restraining movement of said element in response to an increase of pressure in said chamber; means for adjusting the force exerted by said restraining means, including a movable member; and a rotatable threaded rod for moving said member; means for indicating the position of said member including a scale and an indicator member; means for moving said indicator member including a rotatable threaded rod; means forming a driving connection between said rotatable rods; means forming a passage adapted to be connected with a closed fluid pressure space, communicating freely with said chamber and including a port; valve means controlling said port, means biasing said valve means to closed position; manual means for operating said valve to open position; latch means in said chamber for retaining said valve open, and operable to allow said valve to close, upon movement of said element into contact therewith.

2. In an automatic fluid flow control device: means including a pressure responsive element forming an expansible chamber; means forming a passage adapted to be connected with a closed fluid pressure space and communicating freely with said chamber; means forming a fluid inlet port and a fluid outlet port; valve means including a valve member operable to positions respectively connecting said passage with either of said ports, means biasing said valve member to an intermediate position closing said ports; manual means for operating said valve member to a position connecting said passage and one of said ports; latch means for releasably securing said valve member in said position and operable to release said valve member for return to its intermediate position upon movement of said element to a predetermined position, said valve member having an actuating portion engageable by said element upon movement past said predetermined position whereby said element operates the valve member to a position connecting said passage and the other of said ports.

3. In an automatic fluid flow control device: a cylinder and piston structure, closed at one end to form an expansible chamber; means forming a passage adapted to be connected with a closed fluid pressure space, communicating freely with said chamber and including a port; valve means including a movable closure for controlling said port; means urging said closure to closed position; manual means for moving said closure to open position; latch means, comprising a resiliently urged element mounted for movement transversely of the direction of movement of said piston, and means on said closure and said element providing cooperating inclined surfaces adapted to engage upon movement of said closure to open position and cause retraction of said element, said element and said means having co-engaging surfaces preventing thereafter return movement of said closure; said latch means having a cam surface thereon normally in the path of movement of said piston and engageable by said piston upon a predetermined movement thereof for moving said element to release said closure.

4. In an automatic fluid flow control device: a cylinder and piston structure, closed at one end to form an expansible chamber; means forming a passage adapted to be connected with a closed fluid pressure space, communicating freely with said chamber and including a port; valve means including a movable closure for controlling said port; means urging said closure to closed position; means for operating said closure to open position including a member movable transversely of the direction of movement of said closure, coengaging cam surfaces respectively on said member and said closure, the cam surface on said member having an intermediate high point for causing said closure to open, and spring means compressed by movement of said member in either direction to opening position and effective to urge said member away from opening position to release said closure; latch means, comprising a resiliently urged element mounted for movement transversely of the direction of movement of said piston, and means on said closure and said element providing cooperating inclined surfaces adapted to engage upon movement of said closure to open position and cause retraction of said element, said element and said means having coengaging surfaces preventing thereafter return movement of said closure; said latch means having a cam surface thereon normally in the path of movement of said piston and engageable by said piston upon a predetermined movement thereof for moving said element to release said closure.

5. In an automatic fluid flow control device: means forming a passage adapted to be connected with a closed fluid pressure space; means, including a pressure responsive element, forming an expansible chamber freely communicating with said passage; means forming a fluid inlet port and a fluid outlet port; valve means including a valve member operable to connect said passage and either port, means biasing said valve member to a position closing said ports; and manual means for operating said valve member to a position connecting said passage and one of said ports; said valve member when in port closing position having a portion engageable by said element to operate said valve member to connect said passage with the other port in response to movement of said element.

6. In an automatic fluid flow control device: means forming a passage adapted to be connected with a closed fluid pressure space; means, including a pressure responsive element, forming an expansible chamber freely communicating with said passage; means forming a fluid inlet port and a fluid outlet port; valve means including a valve member operable to connect said passage and either port, means biasing said valve member to a position closing said ports; manual means for operating said valve member to a position connecting said passage and one of said ports; latch means for maintaining said valve member in said position, and including a cam surface engageable by said pressure responsive element for releasing said valve member; said valve member having a portion extending into the path of movement of said element for engagement thereby after release of said latch means, whereby continued movement of said element operates said valve member to connect said passage and the other of said ports.

7. In an automatic fluid flow control device: means forming a passage adapted to be connected with a closed fluid pressure space; means, including a pressure responsive element, forming an expansible chamber freely communicating with said passage; means forming a fluid inlet port and a fluid outlet port; valve means including a bore and a valve member axially movable therein, said ports and said passage having angularly spaced coplanar openings to said bore; said valve member having axially spaced passages for respectively connecting said passage opening with either of said port openings; means biasing said member to closed position in which said openings into the bore are intermediate the passages in said member; and manual means for operating said valve member to connect said passage with one of said ports; said valve member having an extension for engagement by said element to operate said valve member to connect said passage with the other port in response to movement of said element.

JULIUS A. PINCHEV.

REFERENCES CITED

The following references are of record in the file of this patent:

UNITED STATES PATENTS

| Number | Name | Date |
|---|---|---|
| 1,103,474 | Bickford | July 14, 1914 |
| 1,286,119 | Sagaser | Nov. 26, 1918 |
| 1,334,897 | Greer et al. | Mar. 23, 1920 |
| 1,461,010 | Amdursky | July 3, 1923 |
| 1,495,553 | Durham | May 27, 1924 |
| 1,699,378 | Smith | Jan. 15, 1929 |
| 1,713,849 | McAneny | May 21, 1929 |
| 1,724,389 | Abel | July 3, 1929 |
| 2,173,369 | McElroy | Sept. 19, 1939 |

FOREIGN PATENTS

| Number | Country | Date |
|---|---|---|
| 23,333 | Norway | May 13, 1913 |